(12) United States Patent
Higuchi

(10) Patent No.: US 6,455,961 B1
(45) Date of Patent: Sep. 24, 2002

(54) MOTOR WITH ALIGNED MAGNETIC CENTERS

(75) Inventor: Daisuke Higuchi, Nagano (JP)

(73) Assignee: Sanyo Seiki Mfg. Co., Ltd., Nagano (JP)

( * ) Notice: Subject to any disclaimer, the term of this patent is extended or adjusted under 35 U.S.C. 154(b) by 0 days.

(21) Appl. No.: 09/872,160

(22) Filed: May 31, 2001

(30) Foreign Application Priority Data

Sep. 29, 2000 (JP) ........................................ 2000-301008

(51) Int. Cl.[7] .......................... H02K 11/00; G11B 17/02
(52) U.S. Cl. ...................... 310/67 R; 310/216; 310/254; 310/259; 360/99.08; 360/98.07; 360/99.04
(58) Field of Search ................................ 310/216, 217, 310/218, 254, 257, 258, 259, 42, 67 R, 91; 360/98.07, 99.04, 99.08; 29/596–598

(56) References Cited

U.S. PATENT DOCUMENTS

| | | | | |
|---|---|---|---|---|
| 5,500,780 A | * | 3/1996 | Boutaghou et al. | 360/99.08 |
| 5,670,837 A | * | 9/1997 | Boutaghou et al. | 310/67 R |
| 5,955,815 A | * | 9/1999 | Kurosaka et al. | 310/67 R |
| 6,104,570 A | * | 8/2000 | Pelstring | 360/98.07 |

* cited by examiner

Primary Examiner—Tran Nguyen
(74) Attorney, Agent, or Firm—Hogan & Hartson, LLP

(57) ABSTRACT

A motor includes a stator core held on a core holder, the stator core includes a stacked magnetic body having a plurality of magnetic plates with the magnetic plates being piled up in an axial direction. The motor also includes a core support portion provided in the core holder with the core support portion including a core mounting face and a core locating face. The core locating face is formed near a magnetic center of the stator core with respect to the axial direction and formed flat in the core holder in a radial direction. The stacked magnetic body is divided into two stacked magnetic bodies with a boundary position of the two stacked magnetic bodies being set near the magnetic center of the stator core and the boundary surface of one of the two stacked bodies abuts against the core locating face of the core holder in the axial direction.

20 Claims, 3 Drawing Sheets

MOTOR WITH ALIGNED MAGNETIC CENTERS

BACKGROUND OF THE INVENTION

1. Field of the Invention

The present invention relates to improvements on motors, and more particularly to improvements for aligning the magnetic centers of motors.

2. Related Art

FIG. 3 shows a conventional motor. The motor includes a core support portion for a stator core 3 formed in a core holder 2, and a stator 1 accommodated therein. The core support portion is provided with a generally cylindrical core clamp face 2a positioned in the axial direction and a flat core locating face 2b perpendicular to the axial direction. The stator core 3 includes a stacked magnetic body having a plurality of magnetic plates 3a fixed to an outer peripheral surface of the core clamp face 2a. The magnetic plates 3a may be fixed by press fitting or another type of fitting method. The magnetic plates 3a, at a bottom portion of the stator core 3, abuts against the core locating face 2b while the stator core 3 is maintained in the axial direction.

On the outside of the stator core 3, there is a cupshaped rotor case 4 which is rotatably disposed to cover the stator 1 and the stator core 3. A circular driving magnet 5 is mounted on an inner circumference of the rotor case 4 and disposed in a manner so as to face salient poles.

In order to achieve a stable rotation of the rotor case 4, an attracting magnet 6 is provided on an uppermost portion of magnetic plates 3a. The attraction force of the attracting magnet 6 causes the rotor case 4 to move in the axial direction towards the stator 1. As a result of providing attracting magnet 6, the rotor case 4 rotates in such a manner that the magnetic center of the driving magnet 5 does not displace the position of the magnetic center f the stator core 3 in the axial direction. Further, the attracting magnet 6 prevents vibrations and undesired sounds created by the displacement of the magnetic center of the driving magnet 5 with respect to the magnetic center of the stator core 3.

In the embodiment described above even when the attracting magnet 6 is provided such that both magnetic centers of the driving magnet 5 and the stator core 3 are in the same position, there are times when both magnetic centers do not coincide with each other. This is because there are variations in the dimensions of the parts used. It is however, acceptable in the industry to have variations in these parts. For example, the stacked magnetic body including the stator core 3 which includes a plurality of magnetic plates 3a which are piled up in an axial direction have variations in the axial direction. Thus, it is difficult to manufacture and insure that both the magnetic centers coincide with each other with a high degree of accuracy.

Also, in the embodiment described above, dimensional errors in the axial direction of the stator core 3 occur wherein the magnetic center of the stator core 3 has been designed to be off set from the magnetic center of the driving magnet 5 by a specified distance. As a result, vibrations and undesired sounds occur.

SUMMARY OF THE INVENTION

Other features and advantages of the invention will be apparent from the following detailed description, taken in conjunction with the accompanying drawings that illustrate, by way of example, various features of embodiments of the present invention.

The present invention provides a motor including a stator core held on a core holder with the stator core including a stacked magnetic body having a plurality of magnetic plates with the magnetic plates being piled up in an axial direction. The motor also includes a core support portion provided in the core holder with the core support portion including a core mounting face and a core locating face. The core locating face is formed near a magnetic center of the stator core with respect to the axial direction and formed flat in the core holder in a radial direction. The stacked magnetic body is divided into two stacked magnetic bodies with a boundary position of the two stacked magnetic bodies being set near the magnetic center of the stator core and the boundary surface of one of the two stacked bodies abuts against the core locating face of the core holder in the axial direction.

PREFERRED EMBODIMENTS OF THE INVENTION

Figure 1:
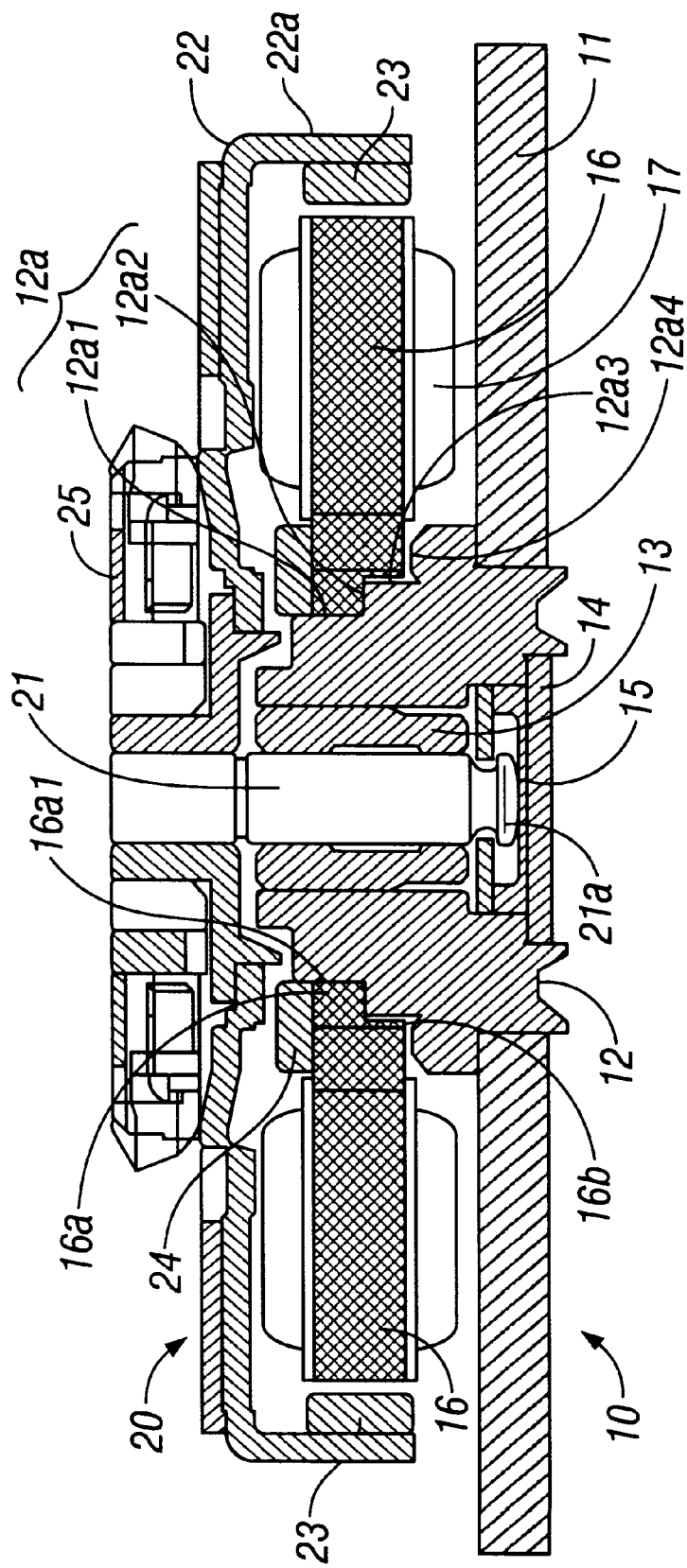
FIG. 1 shows a cross-sectional view of a motor for a CD-ROM drive apparatus in accordance with an embodiment of the present invention.

Embodiments of the present invention are described below. FIG. 1 shows a cross-sectional view of a motor for a CD-ROM drive apparatus, for example, in accordance with one embodiment of the present invention.

As shown in FIG. 1 a shaft-rotating spindle motor for a disk drive apparatus generally includes a stator assembly 10, which is a fixed member, and a rotator assembly 20, which is a rotating member assembled in an axial direction on top of the stator assembly 10. The stator assembly 10 has a base plate 11, a bearing holder 12 fixed to a center area of the base plate 11, and a metal bearing 13, which is a slide bearing member that is attached to an inner circumference of the bearing holder 12. The metal bearing 13 is formed from an oil impregnated sintered bearing member, and a rotating shaft 21 is inserted inside the center hole formed in the metal bearing 13 and is supported in a radial direction.

The rotating shaft 21 extends upward from an upper end of the metal bearing 13, and, a sphere-shaped pivot portion 21a is provided on a bottom end of the rotating shaft 1. A thrust plate 14 is fixed to the bottom end of the bearing holder 12 and a low-cup-shaped thrust pad member 15 is mounted inside of the thrust plate 14. A pivot portion 21a of the rotating shaft 21 is disposed so as to contact the upper surface of the thrust pad member 15, and thus, to support the rotating shaft 21 in the axial direction.

A core support portion 12a is formed with respect to a radial direction on the outer circumference of the bearing holder 12. A stator core 16 including a stacked body made of flat rolled magnetic steel sheets is fixed to the outer surface of the core support portion 12a. The stator core 16 also includes salient pole portions wherein on each salient pole portion of the stator core 16 is wound a driving coil 17.

Figure 2:
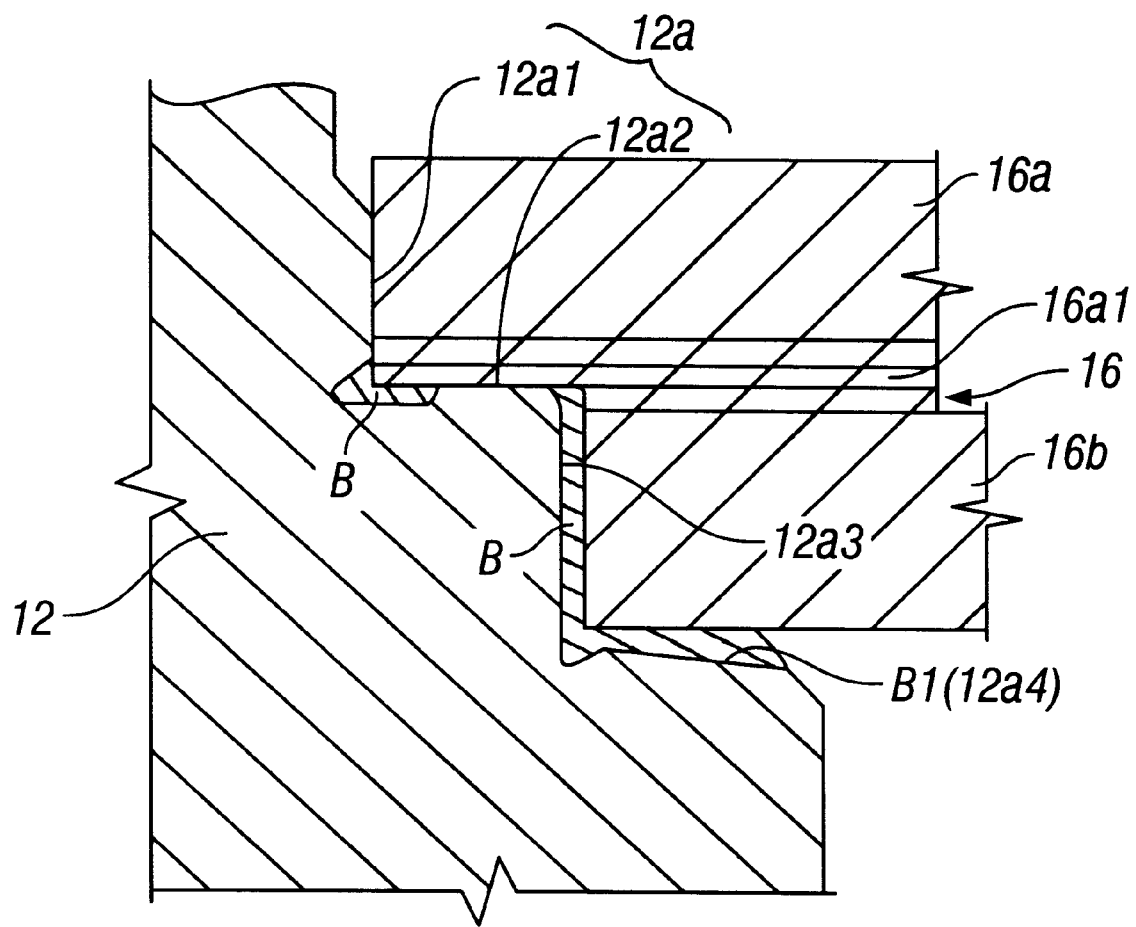
FIG. 2 shows a cross-sectional view of an enlarged stator core mounting part of the motor shown in FIG. 1.

As shown in FIG. 2, the outer circumferential face of the core support portion 12a includes a core mounting face 12a1, which is formed in a generally cylindrical shape, and a core locating face 12a2 which is formed flat and extends radially, so that the core mounting face 12a1 and the core locating face 12a2 form a rectangular stage (or a rectangular step or shape). The core locating face 12a2 is formed flat protruding radially outward from the bottom end of the core mounting face 12a1, which is formed with a small diameter with respect to the core locating face 12a2.

The outer circumferential face of the core locating face 12a2 includes a vertical core confronting face 12a3, which is formed in a generally cylindrical shape, and a horizontal core confronting flat face 12a4 which is formed generally flat extending radially, so that the vertical core confronting face 12a3 and the horizontal core confronting flat face 12a4 form a rectangular stage (or a rectangular step or shape).

The stator core 16 is divided into two parts in the axial direction-an upper stacked magnetic body 16a and a lower stacked magnetic body 16b. The thickness in the axial direction of the lower stacked magnetic body 16b is the same as that of the upper stacked magnetic body 16a. Each magnetic plate of the upper stacked magnetic body 16a has a mounting hole of a smaller diameter than e magnetic plate of the lower stacked magnetic body 16b in the center portion for press-fitting to the core mounting face 12a1 of the core support part 12a.

The lower stacked magnetic body 16b has a shape corresponding to the shape of the core locating face 12a2 of the core support portion 12a. For example, each magnetic plate of the lower stacked magnetic body 16b has a center hole of a larger diameter than the mounting hole of each of the magnetic plates of the upper stacked magnetic body 16a. Moreover, the center hole of the lower stacked magnetic body 16b is formed so as to have a clearance with the vertical core confronting face 12a3. Thus, when mounted the lower stacked body 16b is not in contact with the core confronting circumferential face 12a3 of the bearing holder 12. Furthermore, the horizontal core confronting flat face 12a4 of the bearing holder 12 is also formed so as to have a clearance with the bottom surface of the lower stacked magnetic body 16b. Thus, when mounted the lower stacked body 16b is not in contact with the core confronting flat face 12a4 of the bearing holder 12.

According to an embodiment of the present invention, the stator core 16 is divided into the upper stacked magnetic body 16a and the lower stacked magnetic body 16b in the axial direction at the position corresponding to the magnetic center of the stator core 16. The magnetic center of the stator core 16 is substantially positioned at the center location of the axial direction. For example, the width of the upper stacked body 16a and the width of the lower stacked body 16b are the same. The magnetic plate 16a1 corresponding to the bottom end in the axial direction of the upper stacked body 16a is a center magnetic plate of the stator core and the bottom surface of the center magnetic plate 16a1 abuts in the axial direction against the core locating face 12a2 of the core support portion 12a. Therefore, the entire stator core 16 is located in a predetermined position in the axial direction whereby the bottom surface of the center magnetic plate 16a1 of the upper stacked magnetic body 16a abuts against the core locating face 12a2 instead of the bottom surface of the lower stacked magnetic body 16b abutting against the core confronting flat face 12a4. In particular, the center magnetic plate 16a1 corresponding to the magnetic center position, abuts and is held at the core locating face 12a2 of core support portion 12a directly. Therefore, the magnetic center of the stator core 16 is maintained.

Preferably, the width or the number of plates of the upper stacked magnetic body 16a and the width or the number of plates of the lower stacked magnetic body 16b are the same. In this case, the bottom surface of the center magnetic plate 16a1 of the upper stacked magnetic body 16a is positioned at the magnetic center position with ease and with a high degree of precision.

However, in some situations the width or the number of plates of the two stacked magnetic bodies is not the same. For example, when the entire stator core 16 includes an odd number of magnetic plates,(for example, 9 magnetic plates) the stator core can not be divided into the upper and lower stacked magnetic bodies having the same number of plates. In the example above, the entire stator core may be divided into a four-piece upper stacked magnetic body 16a and a five-piece lower stacked magnetic body 16b. In this case, the bottom surface of the upper stacked magnetic body 16a is also easily positioned near the magnetic center position.

Even when the entire stator core 16 includes an even number of magnetic plates, (for example, twenty magnetic plates) the magnetic plates may not necessarily be divided evenly between the two stacked magnetic bodies. For example, the entire stator core may be divided into a twelve or thirteen-piece upper stacked magnetic body 16a and an eight or seven-piece lower stacked magnetic body 16b, respectively. In this case, similar to the previous example above with an odd number of magnetic plates, the bottom surface of the upper stacked magnetic body 16a is easily located in the magnetic center position. Therefore, the magnetic center position of the stator core can be determined with a high degree of precision in comparison with the prior art.

Figure 3:
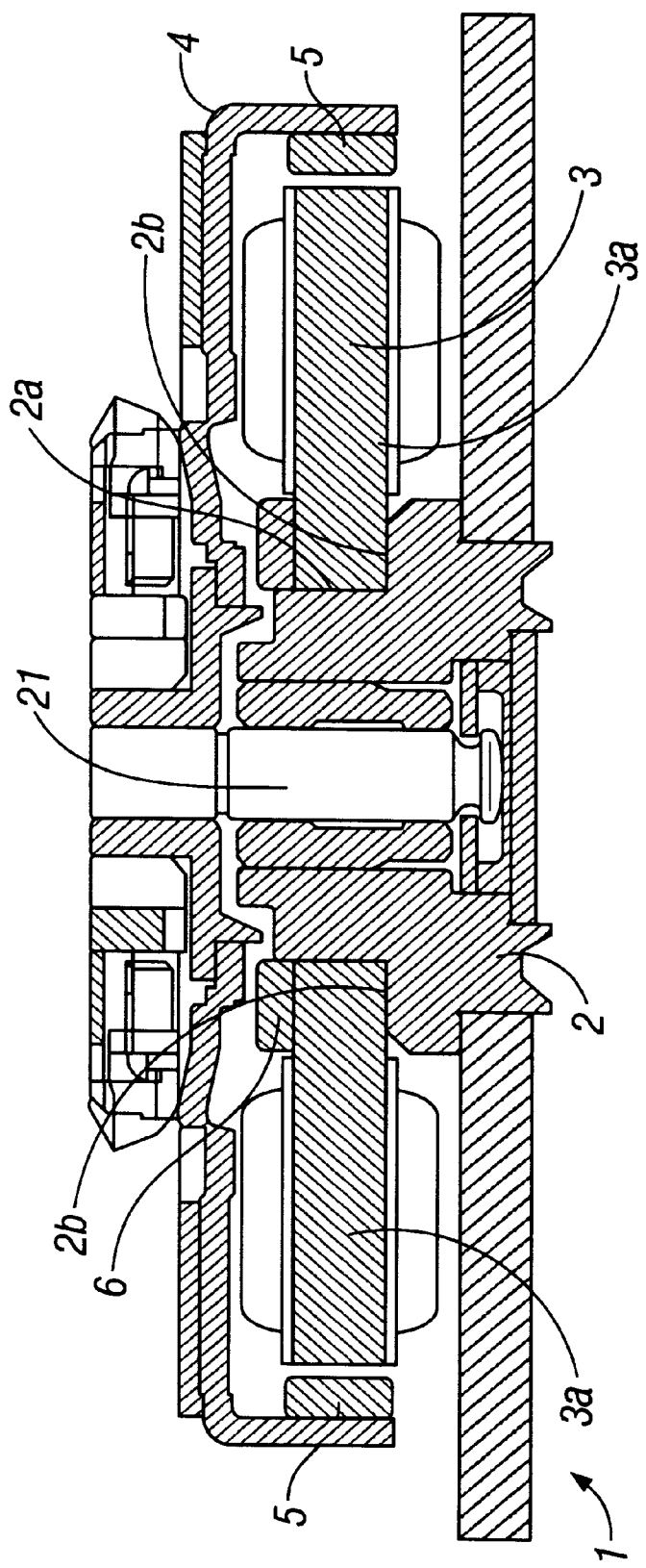
FIG. 3 shows a cross-sectional of a motor for a conventional CD-ROM drive apparatus.

Referring back to FIG. 3, the rotating shaft 21 in the upward protruded portion is fixed to the boss portion of rotor case 22 of an outer-rotor type having a shallow bowl shape. A circular ring-shaped portion 22a is formed at the outside periphery portion of the rotor case 22 which extends in a radial direction outward from the boss portion. A ring-shaped driving magnet 23 is fixed on the inner circumferencial face of the ringshaped portion 22a. The magnetizing surface formed on both inner and outer circumferencial surfaces of the driving magnet 23 is disposed to face a salient pole portion of the stator core 16 from outside in a radial direction. The magnetic center in the axial direction of the driving magnet 23 after assembled is positioned in a location to coincide in the axial direction with the magnetic center of the stator core 16.

On the other hand, an attracting magnet 24 is mounted on the uppermost magnetic plate of the stator core 16 in an inner area of rotator assembly 20 in a radial direction. Attracting magnet 24 has a magnetic attraction force which pulls the rotor assembly 20 including the rotor case 22 in an axial direction towards the stator core 16. Attracting magnet 24 is provided to maintain the magnetic center of the driving magnet 23 with the magnetic center of the stator core 16 in the axial direction and to keep the rotor case 22 rotating with this relationship.

This relationship is used in situations where there is a difference in the positions of the two magnetic centers. For example, the width of the lower stacked body 16b may be a little thicker than the upper stacked body 16a, and thus, the magnetic center of the stator core 16 is positioned a little lower than the core locating face 12a2 and the driving magnet 23. In this case, the magnetic center of the stator core 16 can also be positioned with a high degree of accuracy. As a result, the vibrations and the undesired sounds can be prevented.

On an upper face of the rotor case 22, a hub base 25 is provided as a disc placing portion. The hub base 25 is fixed to the outside of the boss portion of the rotor case 22. The center hole of a recording disk, not shown, is placed on the hub base 25 and the recording disk is mounted to the hub base 25 positioned in a radial and axial direction.

According to another embodiment of the present invention, a spindle motor may be incorporated. With the spindle motor, the center magnetic late 16a1 corresponding to the center location of the stator core 16, which includes a stacked body, abuts against the core locating face 12a2 of the core support portion 12a in the axial direction. Thus, a motor can be assembled such that the magnetic center in the axial direction of the stator core 16 is maintained by the core locating face 12a2 of the stator. As a result, an error with respect to the magnetic center location of the stator core 16 produced by stacking a plurality of magnetic plates from the core locating face like the prior art is reduced and the center location can be obtained easily with a high degree of accuracy.

Furthermore, in the present embodiment, the upper-half stacked body 16a and the lower-half stacked body 16b including the stator core 16 are formed along the core mounting face 12a1 and the core locating face 12a2 of the core support portion 12a. That is, the inner circumferencial face of the upper-half stacked body 16a protrudes further inside than the inner circumferencial face of the lower-half stacked body 16b. The boundary-surface, that is, the bottom face of the upper-half stacked body 16a and the lower-half stacked body 16b, which is the center position of the stator core, abuts the core locating face 12b2, and thus the stator core 16 is mounted with ease and with a high degree of accuracy.

The attracting magnet 24 urges and draws the rotor assembly 20 to the stator assembly 10 and is used together in the present embodiment, and therefore, the magnetic center of the rotor assembly 20 and the magnetic center of the stator assembly 10 are located and maintained in the same position. That is to say, the position of the magnetic center of the stator core 16 and the position of the magnetic center of the driving magnet 23 substantially coincided with each other, and thus, prevent vibrations occurring as a result of the magnetic centers being misaligned.

Furthermore, when the stator core 16 is fixed to the core support portion 12a, an adhesive material B may be preferably provided in an area between the stator core 16 and the core support portion 12a, for example, between the lower stator core 16b and the vertical core confronting face 12a3, as shown in FIG. 2. As a result, the prevention of vibrations can be further provided. When the adhesive material B is provided in the area between the stator core 16 and the core support portion 12a, the width of B1 that includes the bottom surface of the lower area stacked magnetic body 16b and the core confronting flat face 12a4 of the bearing holder 12 may be formed so as to be enlarged gradually(to the right side of FIG. 2). As a result, leaking of the adhesive material B can be prevented by means of the capillary attraction phenomenon.

The present invention provides a motor including a stator core held on a core holder with the stator core including a stacked magnetic body having a plurality of magnetic plates with the magnetic plates being piled up in an axial direction. The motor also includes a core support portion provided in the core holder with the core support portion including a core mounting face and a core locating face. The core locating face is formed near a magnetic center of the stator core with respect to the axial direction and formed flat in the core holder in a radial direction. The stacked magnetic body is divided into two stacked magnetic bodies with a boundary position of the two stacked magnetic bodies being set near the magnetic center of the stator core and the boundary surface of one of the two stacked bodies abuts against the core locating face of the core holder in the axial direction.

In this configuration, the position of the magnetic center of the stator core means, for example, for a core of twenty magnetic plates, the magnetic center will be in the vicinity of the tenth plate including the seventh plate or the thirteenth plate.

According to an embodiment of the present invention, the stator core is assembled to the stator with a high degree of accuracy, and therefore, the magnetic center position of the stator core can be accurately determined with a simple construction and the characteristics of the motor are stabilized.

Preferably, the boundary surface of one of the two stacked bodies is a contacting surface of a center magnetic plate. The center magnetic late is located at the magnetic center in the axial direction of the stator core and the contacting surface of the center magnetic plate abuts against the core locating face of the core support portion.

With this structure, the core locating face of the core support portion abuts and holds the center magnetic plate which is located at the magnetic center of the stator core, whereby the magnetic center of the stator core can be positioned with a high degree of accuracy.

Preferably, the position of the magnetic center in the axial direction of the stator core substantially coincides with the position of the magnetic center in the axial direction of the driving magnet provided with a rotor.

Furthermore, the core mounting face is formed in a generally cylindrical shape on the outer circumferential face of the core support portion and the core locating face is formed flat protruding in a radial direction outward from the bottom end of the core mounting face, so that the core mounting face and said core locating face form a stage having a step formed in the radial direction, and the two stacked bodies have different diameters of their center holes, one of the two stacked bodies which has a center hole of a smaller diameter than the other abuts against the core locating face of the core support portion.

With this structure, the positioning of the stator core is attained with ease and with a high degree of accuracy only by abutting one of the two stacked bodies which has a center hole of a smaller diameter than the other against the core locating face of the core support portion.

The embodiments of the invention are described above. However, needless to say, the present invention is not limited to the embodiments described above, and many modifications can be made without departing from the subject matter of the present invention.

In the above-mentioned embodiments, for example, the core support portion 12a holds the center magnetic plate 16a1 corresponding to the magnetic center of stator core 16. However, the center magnetic plate 16a1 does not always have to be held abutting to the core locating face 12a2. The important thing is that the magnetic plate is positioned near the center of the stator core 16 and abuts against the core locating face 12a2. As a result, it is easy to position the stator and set the magnetic center in a desired position compared to the prior art.

In addition, the present invention is not limited to a motor where the magnetic center of the stator core 16 coincides with the magnetic center of the driving magnet 23. The present invention can also be applied to a motor where the magnetic center of the stator core 16 does not coincide with the magnetic center of the driving magnet 23, that is, there is some predetermined and designed difference between the center positions.

Furthermore, the present invention can be similarly applied to motors for rotating disks such as a hard disk, a floppy disk, or DVD, and to other various types of motors.

In the above-mentioned embodiments, a metal bearing 13 is used for a slide bearing member, but a dynamic pressure type bearing can be applied to the bearing member instead of the metal bearing.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive. The scope of the invention being indicated by the appended claims, rather than the foregoing description, and all changes which come within the meaning and range of equivalency of the claims are therefore intended to be embraced therein.

What is claimed is:

1. A motor comprising:
   a stator core held on a core holder, the stator core including a stacked magnetic body having a plurality of magnetic plates, the magnetic plates being piled up in an axial direction;
   a core support portion provided in the core holder, the core support portion including a core mounting face and a core locating face;
   the core locating face is formed near a magnetic center of the stator core with respect to the axial direction and formed flat in the core holder in a radial direction; and
   the stacked magnetic body being divided into two stacked magnetic bodies with a boundary position of the two stacked magnetic bodies being set near the magnetic center of the stator core and the boundary surface of one of the two stacked bodies abuts against the core locating face of the core holder in the axial direction.

2. The motor according to claim 1, wherein the boundary surface of one of the two stacked magnetic bodies is a contacting surface of a center magnetic plate which is located at the magnetic center in the axial direction of the stator core and the contacting surface of the center magnetic plate abuts against the core locating face of the core support portion.

3. The motor according to claim 2, wherein the position of the magnetic center in the axial direction of the stator core substantially coincides with the position of the magnetic center in the axial direction of a driving magnet of a rotor.

4. The motor according to claim 1, wherein the core mounting face is formed in a generally cylindrical shape on an outer circumferential face of the core support portion and the core locating face is formed flat protruding in a radial direction outward from a bottom end of the core mounting face, so that the core mounting face and the core locating face form a stage having a step in a radial direction, and the two stacked bodies have different diameters of their center holes, one of the two stacked bodies that has a center hole of a smaller diameter than the other abuts against the core locating face of the core support portion.

5. The motor according to claim 4, wherein an inner circumferential surface of at least one of the two stacked bodies is coupled to the core mounting face of the core support portion by press fitting.

6. The motor according to claim 1, further comprising a stator and a rotor, wherein said rotor is disposed in the stator.

7. The motor according to claim 6, wherein the stator has a magnetic attraction means to urge and draw the rotor in the axial direction.

8. The motor according to claim 7, wherein the magnetic attraction means is a permanent magnet.

9. The motor according to claim 6, wherein the width in the axial direction of one of the two stacked magnetic bodies having a boundary surface abutting against the core locating face of the core holder, is equal to the width of the other of the two stacked magnetic bodies in the axial direction.

10. The motor according to claim 9, wherein the other of the two stacked magnetic bodies has a clearance with a confronted surface of the stator in the axial direction so that the position of the boundary surface abutting against the core locating face of the core holder is not affected by the confronted surface facing with the opposite surface of the other of the two stacked magnetic bodies.

11. The motor according to claim 10, wherein said clearance of the other of the two stacked magnetic bodies with a confronted surface of the stator in the stacked direction is filled with an adhesive material.

12. The motor according to claim 1, wherein one of the two stacked magnetic bodies which has a boundary surface abutting against the core locating face of the core holder has a same number of plates as the other of the two stacked magnetic bodies.

13. The motor according to claim 12, wherein the other of the two stacked magnetic bodies has a clearance with a confronted surface of the stator in the axial direction so that the position of a boundary surface abutting against the core locating face of the core holder is not affected by the confronted surface facing with the opposite surface of the other of the two stacked magnetic bodies.

14. The motor according to claim 13, wherein the clearance of the other of the two stacked magnetic bodies with a confronted surface of the stator in the axial direction is filled with an adhesive material.

15. A motor comprising:
   a stator including a core holder;
   a core support portion provided in the core holder, the core support portion including a core mounting face and a core locating face;
   a stator core held on the core holder and including a stacked magnetic body which includes a plurality of magnetic plates, the magnetic plates being piled up in an axial direction;
   the core locating face is formed near a magnetic center of the stator core with respect to the axial direction and formed flat in the core holder in a radial direction; and
   the stacked magnetic body being divided into two stacked magnetic bodies, a boundary position of the two stacked magnetic bodies being set near the magnetic center of the stator core and the boundary surface of one of two stacked bodies abuts against the core locating face of the core holder in the axial direction.

16. The motor according to claims 15, wherein said stator core further includes salient pole portions.

17. The motor according to claim 16, wherein on each of said salient pole portions is wound a driving coil.

18. The motor according to claim 15, wherein the stator has a magnetic attraction means to urge and draw the rotor in the axial direction.

19. The motor according to claim 18, wherein said magnetic attraction means is a permanent magnet.

20. The motor according to claim 15, wherein the width in the axial direction of one of the two stacked magnetic bodies having a boundary surface abutting against the core locating face of the core holder, is equal to the width of the other of the two stacked magnetic bodies in the axial direction.

* * * * *